Sept. 4, 1945.　　　　E. M. McELHINNEY　　　　2,384,185
COUPLER DEVICE
Filed May 31, 1943　　　　2 Sheets-Sheet 1
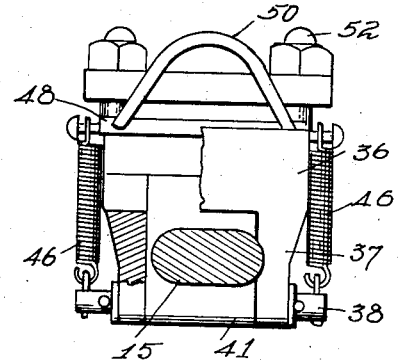
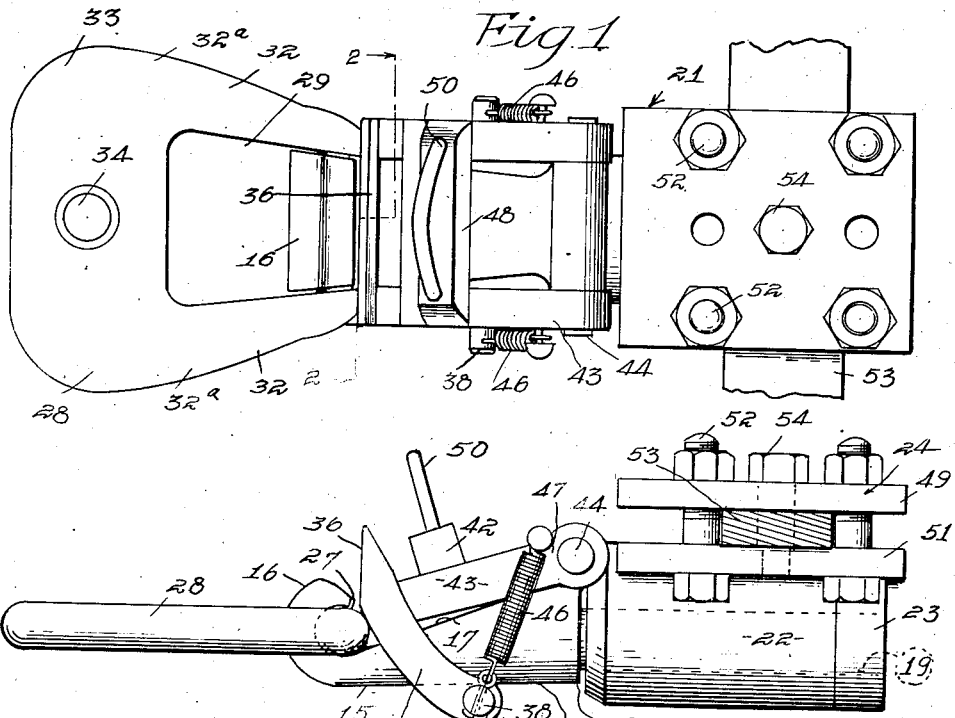
INVENTOR.
ERIC M. McELHINNEY
BY Rudolph L. Lowell
Attorney Sept. 4, 1945.  E. M. McELHINNEY  2,384,185
COUPLER DEVICE
Filed May 31, 1943  2 Sheets-Sheet 2
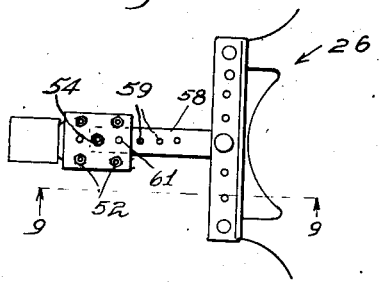
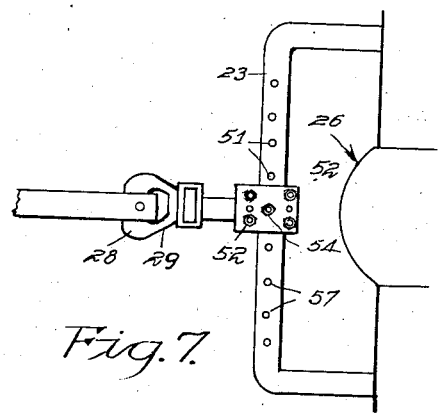
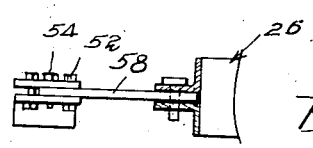
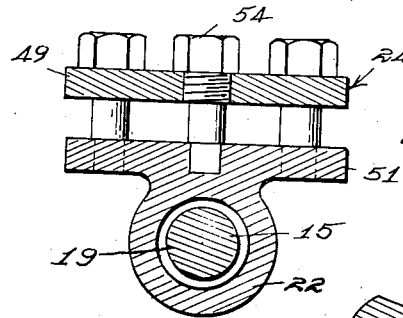
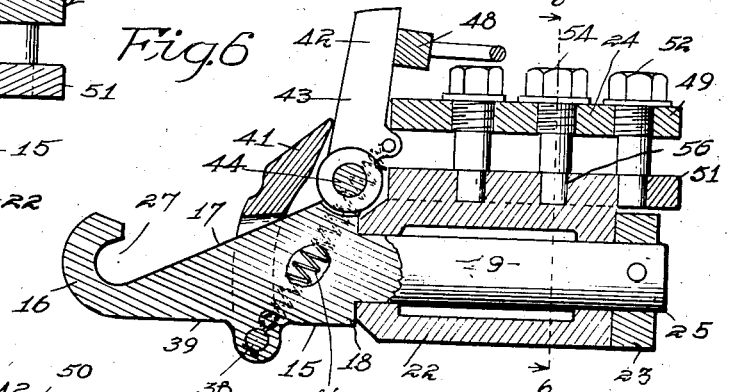
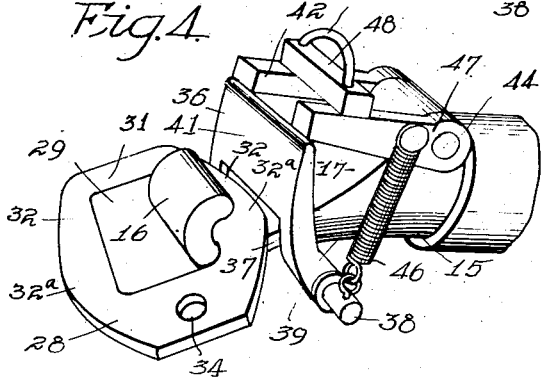
INVENTOR.
Eric M. McElhinney
BY
Rudolph L. Lowell
Attorney Patented Sept. 4, 1945

2,384,185

UNITED STATES PATENT OFFICE 2,384,185

COUPLER DEVICE

Eric M. McElhinney, Dysart, Iowa

Application May 31, 1943, Serial No. 489,186

9 Claims. (Cl. 280—33.15)

This invention relates generally to coupler devices and in particular to a coupler for connecting a tractor unit with a trailer unit.

It is an object of this invention to provide an improved coupler.

A further object of this invention is to provide a coupler which is capable of maintaining a trailer unit and a tractor unit in positive connection on movement of the two units in either direction or on rotational movement of one unit relative to the other unit.

Yet another object of this invention is to provide a coupler which is continuously self-locking regardless of any wear which might occur in its locking mechanism.

A further object of this invention is to provide a coupler in which the locking is accomplished by the movement of a locking portion to a locking position in which it is incapable of being moved by any pulling or pushing force tending to release the coupler.

A still further object of this invention is to provide a coupler which is simple and rugged in construction comprised of a minimum number of movable and working parts, positive in operation and easily and quickly operated to locking and releasing positions.

A feature of this invention is found in the provision of a coupler including a hook portion at one end for receiving a hitch, a pivoted keeper or latch for closing the hook, and a spring-actuated pivoted locking member frictionally engageable with the keeper and assembled relative to the keeper to continuously lock the keeper in a hook-closing position regardless of the direction in which pulling forces are applied on the hitch.

A further feature of this invention is found in the provision of a coupler having a hook portion for receiving a hitch, a latch movable toward and away from a hook-closing position, and a pivoted locking member biased into frictional engagement with the latch to keep it in a hook-closing position. The bias is accomplished by tension means arranged to move through the pivotal support of the locking member to releasably hold the same in a released position to provide for a free movement of the latch relative to the hook portion.

Yet another feature of this invention is found in the provision of a coupler having a hook portion for receiving a hitch, in which the hitch is of a construction such that it may be connected with the hook when the hook and hitch are out of alignment with the line of normal pull on the coupler, and then pulled into a normal relative assembly position with the hook.

Other objects, features and advantages of this invention will become apparent from the following description when taken in connection with the accompanying drawings in which:

Fig. 1 is a plan view of the coupler of this invention;

Fig. 2 is a transverse sectional view of the coupler as seen on line 2—2 in Fig. 1;

Fig. 3 is an elevational side view of the coupler;

Fig. 4 is a side perspective view of the coupler showing a hitch about to be connected therein;

Fig. 5 is a longitudinal sectional view of the coupler showing the locking mechanism in a hitch-releasing position;

Fig. 6 is a transverse sectional view taken along the line 6—6 in Fig. 5;

Fig. 7 is a plan view of the coupler of this invention in assembly relation with a tractor unit having a transversely extended drawbar;

Fig. 8 is illustrated similarly to Fig. 7 and shows the connection of the coupler of this invention with a tractor unit having a longitudinally extending drawbar; and Fig. 9 is a view partly in section as seen along the line 9—9 in Fig. 8.

The coupler of this invention is illustrated in the drawings as applied to the connection of a tractor unit with a trailer unit having a hitch carried thereon. The coupler includes a longitudinally extending body member having a hook at one end for receiving the hitch and rotatably supported at its opposite end on the tractor unit. A pivoted keeper movable toward and away from a hook-closing position is pivotally supported on axis means located adjacent one side of the body member. The keeper is locked in a hook-closing position by a pivoted locking member having one end pivoted adjacent the end of the body member opposite the hook thereon, and is frictionally engageable with the keeper at a position substantially opposite the opening in the hook, and in turn the pivotal axis of the hitch carried in the hook. When in a hook-closing position the keeper lies in a plane which is substantially normal to the plane of the locking member. Any forces applied on the hitch to pivotally move the keeper away from a hook-closing position, as occurs on a rearward or reverse movement of the tractor unit, acts through the pivoted locking member against the support of the locking member. These forces are thus incapable of pivotally moving the locking member so that the keeper is positively held against opening the hook.

When the tractor is moving in a forward direction the keeper and the locking member are entirely free of any pulling force on the hitch which force is applied only on the hook.

Spring means connected at one end to the axis of the keeper and at its opposite end to the locking member adjacent its pivotal support acts to bias the free end of the locking member toward the axis means for the keeper. Thus, regardless of any relative wear between the keeper and the hook, and the keeper and the locking member, the locking member and keeper are always maintained in frictional engagement and in a hook-closing position. On movement of the locking member to a position to release the keeper the spring means is moved through the pivotal support of the locking member to releasably hold the locking member out of an engaging position with the keeper. When the locking member is in this release position the keeper is free to be pivotally moved relative to the hook to provide for the connection and removal of the hitch on the trailer unit with the hook. After the hitch is in the hook, a locking of the hitch in the hook is simply accomplished by merely moving the locking member toward the keeper until the spring means is returned through the pivotal support of the locking member at which time the biasing action of the spring means to maintain the keeper and locking member in frictional engagement becomes effective.

Referring to the drawings the coupler of this invention is shown in Figs. 1 and 3 as including a body member 15 having a transversely extended hook 16 at one end projected from a side 17 of the body member 15. The opposite end 18 of the body member 15 is integrally formed with a longitudinally extended shaft 19 which is rotatably supported in a sleeve bearing 22 through which the shaft 19 is projected. Retention of the shaft 19 in a rotatably supported position within the sleeve bearing 22 is accomplished by a retaining collar 23 welded or otherwise suitably secured to the projected end 25 of the shaft 19. The body member 15 is thus completely free to rotate within the sleeve bearing 22. The sleeve 22 is provided with a connector means, indicated generally as 24, adapted for connection with a tractor unit 26 (Fig. 7) as will be later fully explained.

The hook 16 is formed with an open portion 27 (Figs. 3 and 5) facing toward the end 18 of the body member 15. This open portion 27 is of a size to receive a hitch 28 carried on a trailer unit (not shown). As illustrated in Figs. 1 and 4 the hitch 28 is of a substantially rectangular flat shape having an opening 29 formed between an end portion 31, which is receivable within the hook 16, and side portions 32 connecting the end portion 31 with a flat end portion 33 having an aperture 34 at which the hitch is pivotally connected to a trailer unit. The hitch, as clearly appears in Fig. 1, is widest at the flat end 33 and tapers or converges toward the end portion 31, so that the side portions 32 incline toward each other at the end portion 31. This construction of the hitch 28 provides for the engagement of the hitch with the hook 16 when the tractor unit 26 and the trailer unit are off-set from each other, that is out of longitudinal alignment, and for the movement of the hitch portion 31 into the hook 16 when the tractor unit is operated in a forward direction, as will be later fully explained. The opening 29 is of a size to loosely fit over the hook 16 to provide for a pivotal movement of the hitch about its pivotal support at 34 and into a hook-engaging position.

When the hitch end portion 31 is received within the hook 16 a positive locking of the hitch 28 with the hook to prevent it from becoming disconnected, while permitting a rotation of the hitch end portion 31 within the hook, is accomplished by means including a pivoted keeper or latch 36. The latch 36 is of a substantially U-shape (Figs. 2 and 4), with the legs 37 in a straddling relation with the body member 15 and pivotally supported at their free ends on axis means 38 located adjacent the side 39 of the body member 15 and substantially intermediate the hook 16 and the body member end 18. The connecting portion 41 between the legs 37 extends transversely across the side 17 of the body member 15 and, on pivotal movement of the keeper 36 on the axis means 38, is movable toward and away from a position for closing the open portion 27 of the hook 16.

The keeper or latch is positively locked in a hook-closing position by means including a pivoted locking member 42 of substantially U-shape having the free ends of its leg portions 43 pivotally supported on axis means 44 located at the side 17 of the body member 15 adjacent the end 18 of the body member. The opposite ends of the leg portions 43 are connected by a portion 48 and are of a length to frictionally engage the base or connecting portion 41 of the U-shaped latch 36 when the locking member 42 is in a plane substantially normal to the plane of the latch 36. When the locking member 42 and the latch 36 are in this relative position normal to each other the plane of the locking member is substantially parallel to the side 17 of the body member 15 and common with a plane extended through the center of the axis means 44 and the axis of rotation of the hitch portion 31 located within the hook 16.

From a consideration of Fig. 3, therefore, it is seen that the complete force of any forward pulling on the hitch 28 is applied to the hook 16. However, when a pushing force, or a force applied to the right, as shown in Fig. 3, is applied on the hitch 28, such force is substantially free of the hook 16, by virtue of its open portion 27, and is carried entirely by the locking action of the latch 36 and locking member 42. This force is completely counteracted by these parts due to their relative arrangement, when the latch is located in a hook-closing position, so that the application of such pushing is through the locking member to its pivotal support 44. Since this force is applied on the locking member in line with its pivotal support it is incapable of pivotally moving the locking member and in turn any pivotal movement of the latch 36 away from a hook-closing position is entirely prevented.

The frictional engagement of the locking member with the latch 36, at a hook-closing position, is continuously maintained by a pair of springs 46 located on opposite sides of the body member 15. Each spring 46 is connected at one end to the axis means 38 of the latch 36 and at its opposite end with a corresponding leg portion 43 of the locking member 42 at a position adjacent the axis means 44. The springs 46 thus bias the locking member 42 in a direction toward the axis means 38 of the latch 36 so as to continuously maintain the latch and locking member in frictional engagement at a hook-closing position.

By virtue of the locking of the latch 36 being accomplished entirely by the relative arrangement of the latch with the locking member 42, as fully explained above, the springs 46 are entirely free of any force tending to open the hook 16 and act entirely only to bias the locking member toward the latch. Because of the initial relative arrangement of the locking member and latch any wear between these parts, or between the latch and hook 16, does not in any way impair the function of the locking means. The legs 37 of the latch 36 are of a contour conforming substantially to the arc of pivotal movement of the ends 47 of the locking member leg portions 43. Thus, as is best shown in Fig. 3, any relative wear between the hook 16, latch 36, and locking member 42 permits an increased travel of the latch toward the left and downwardly as viewed in Fig. 3 and also an increased travel of the locking member downwardly, as also viewed in Fig. 3. This additional movement is accomplished by the action of the springs 46 so that the latch 36 and locking member 42 are maintained in relative positions substantially normal to each other.

When it is desired to release the hitch 28 from the hook 16 the locking member 42 is merely gripped at a handle 50 on the connecting portion 48 for the legs and is pivotally moved upwardly and toward the right, as viewed in Fig. 3, to its release position shown in Fig. 5. On movement of the locking member 42 to its release position the longitudinal axes of the springs 46 are moved toward the right, as viewed in Figs. 3 and 5, through the pivotal support 44 of the locking member 42 to their positions at the right of the pivotal support 44 as shown in Fig. 5. The force of the springs 46 is thus applied from the right of the pivotal support 44, as compared to the application of this force to the left as shown in Fig. 3, so that their biasing action maintains the locking member 42 in its latch-releasing position. The springs 46, therefore, serve the double purpose of maintaining the member 42 in a locking position relative to the latch 36, and of releasably holding the lock 42 out of a latch-engaging position to provide for a free pivotal movement of the latch relative to the hook 16.

In some instances the initial relative positions of the trailer and tractor unit 26 may be such as to require the initial connection of the hook with a part of the hitch side portion 32, as shown in Fig. 4. When the longitudinal axis of the portion 32 is substantially parallel to the hook 16 it is apparent that the hitch may be positively locked with the hook at a side portion 32, if the portion 32 was of a size to be received within the hook. So that the hitch 28 can be initially connected with the hook over a portion 32 thereof, as shown in Fig. 4, but to provide for a final connection of the hitch portion 31 with the hook 16, the side portions 32 slant inwardly of each other toward the end portion 31, as was explained before. Each side portion 32 adjacent the flat end 33 of the hitch 28 is formed with an enlarged portion 32a. Thus on a positioning of the hitch 28 with the hook 16, as shown in Fig. 4, the latch 36 and locking member 42 may be relatively arranged for a hook-closing position. However, due to the enlarged portion 32a the latch and locking member are prevented from moving to their hook-closing positions, as shown in Fig. 3, and assume relative positions as shown in Fig. 4. On a forward movement of the tractor unit 26, or on movement of the body member 15 to the right, as viewed in Fig. 4, the slanted arrangement of the side portions 32 and enlarged portion 32a provide for a pivotal movement of the hitch 28 relative to the hook 16 to in turn move the latch 36 to the right, as also viewed in Fig. 4, and locate the hitch end portion 31 in the hook 16. Concurrently with the positioning of the hitch end portion 31 in the hook 16 the latch 36 and the locking member 42 are moved to their positions shown in Fig. 3 by the action of the springs 46. As a result, even though the tractor and trailer may be out of longitudinal alignment when initially connected, as soon as the tractor is moved forward the two units are positively and automatically connected in the manner explained above.

Tractor units are generally provided with either transversely or longitudinally extended drawbars. To accommodate both of these types of bars the connector means 24 is provided with separable plate members 49 and 51, the plate 51 being integral with the bearing sleeve member 22 and connected with the plate 49 by four bolts 52 arranged to substantially define a square (Figs. 5, 6 and 7). The distance between aligned bolts 52, in a direction longitudinally of the coupler, is such as to loosely receive therebetween a transversely extended drawbar 53. At the center of the square, defined by the bolts 52, there is a retaining bolt 54 threadably secured in the removable plate 49 and having an end portion receivable in a cavity 56 formed in the fixed plate 51. The drawbar 53 is generally formed with a plurality of longitudinally spaced openings 57, one of which is aligned with the bolt 54. Any movement of the drawbar transversely of the coupler is prevented by the bolt 54 and pivotal movement about the bolt 54 is prevented by the bolts 52.

When a longitudinally extended drawbar 58 is used, as shown in Fig. 8, the drawbar is extended between aligned bolts 52 in a direction longitudinally of the coupler device. Since the spaced relation between aligned openings 59 on the drawbar 58 may vary for different drawbars the removable plate member 49 is formed with a plurality of openings 61 for receiving the retaining bolt 54. On alignment of the retaining bolt 54 with an opening 59 the drawbar 58 is held against longitudinal movement relative to the coupler at the bolt 54 and against pivotal movement about the bolt 54 by the bolts 52.

From a consideration of the above description it is seen that the invention provides a coupler device which is comprised entirely of a minimum number of parts and in which locking of a hook portion with a hitch is accomplished only by the relative movement of a pivoted latch member and a pivoted locking member to a hook-closing position. Further, any forces tending to move the latch away from a hook-closing position are counteracted entirely by virtue of the plane of the locking member being substantially coincident with the plane of the applied forces. The terms "tractor unit" and "trailer unit" as used in the description are intended to apply to any two units one of which is connected for pulling or pushing by the other. Although the hitch 28 has been described and illustrated as being on a trailer unit and the hook 16 on a tractor unit, it is to be understood that these parts can be relatively used on either unit.

It is to be understood also that although only a preferred embodiment of the invention has been illustrated and described the invention is not to be so limited, since modifications and changes can be made therein which are within the full intended scope of the invention as defined in the appended claims.

I claim:

1. A coupler for a tractor unit and a trailer unit including a body member having one end carried on said tractor unit and a hook at its opposite end for receiving a hitch on said trailer unit, a pivoted latch member having a portion movable toward and away from a closing position with said hook, axis means intermediate said two ends of the body member for pivotally supporting said latch member, a pivoted locking member pivotally movable in one direction into frictional engagement with said latch member to lock said latch member in hook-closing position, axis means adjacent said one end of the body member for pivotally supporting said locking member, tension means acting on said locking member to maintain said frictional engagement, with said latching member and locking member being in relative positions substantially normal to each other when said latch member is in said hook-closing position, said locking member being pivotally movable in an opposite direction an angular distance such that the line of force of said tension means passes through the center of said locking member axis means to provide for said locking member being held in a latch-releasing position by said tension means.

2. A coupler for a tractor unit and a trailer unit, said coupler including a hook member on one of said units, a movable hitch member of substantially trapezoidal shape on the other of said units, said hitch member having an opening therein to receive said hook, with an end wall and the side walls of said opening being individually receivable within said hook, said side walls converging toward said end wall, means tension-actuated to a hook-closing position to releasably lock said end wall in said hook, means on each of said side walls providing for said locking means being held out of a hook-closing position by a side wall when a side wall is in said hook, said hitch member, when a side wall is in said hook, being movable on the application of a pulling force between said two units to provide for the movement of said end wall into said hook, with said locking means moving into a hook-closing position concurrently with the location of said end wall in said hook.

3. A coupler for a tractor unit and a trailer unit including a body member carried at one end on one of said units, a hook portion at the opposite end of said body member for receiving a portion of a hitch carried on the other of said units, a member pivoted at one end on said body member and having its other end movable toward and away from a hook-closing position, a member pivoted at one end on said body portion and having its free end engageable with said hook-closing member at a position substantially opposite said hitch portion to lock the same in a hook-closing position, and means acting on said locking member to continuously urge said free end thereof toward the pivoted end of said hook-closing member.

4. A coupler for a trailer unit and a tractor unit including a body portion having one end carried on one of said units, a hook portion at the other end of said body portion for receiving a hitch connected with the other of said units, a pivoted keeper for closing said hook portion, axis means adjacent one side of said body portion pivotally supporting said keeper, a pivoted locking member frictionally engageable with said keeper to lock said keeper in a hook-closing position, second axis means adjacent said one end of the body portion pivotally supporting said locking member, and tension means acting on said locking member to bias said locking member toward said first axis means, with said tension means on movement of said locking member to release said keeper being movable through the center of said second axis means to maintain said locking member in a keeper-releasing position.

5. A coupler device including a body member having a hook portion opening inwardly to one side thereof, a pivoted latch of substantially U-shape arranged in a straddled relation with said body member, means on the other side of said body member pivotally supporting the free ends of said latch so that the closed end of said latch is movable in a direction substantially longitudinally of said body member toward and away from a hook closing position, and a pivoted locking member having one end pivotally supported on said one side of the body member for pivotal movement in a direction substantially transversely of said body member, with the free end of said locking member being engageable with said latch, when the latch is in a hook-closing position, to lock said latch against movement away from a hook-closing position.

6. A coupler device including a body member having a hook portion open to one side thereof, with the opening of said hook facing inwardly of said body member, a pivoted latch having one end pivoted on the opposite side of said body member, with its free end movable toward and away from a hook-closing position, and a pivoted locking member having one end pivoted on said one side of the body member, with the free end of said locking member being movable into engagement with the free end of said latch, when the latch is in a hook-closing position, to lock the latch against movement away from a hook-closing position, said locking member in a latch-locking position being in a plane extended substantially through said hook opening and normal to the plane of said latch.

7. A coupler device for a tractor unit and a trailer unit including a hook member on one of said units, a movable hitch member on the other of said units having an opening therein to receive said hook member, with an end wall of said opening being normally receivable within said hook, and the side walls of said opening tapered outwardly in a direction away from said end wall, the taper of said side walls providing for said hitch member being connected with said hook when said tractor unit and trailer unit are out of longitudinal alignment and said end wall being moved into said hook on the application of a pulling force between said two units.

8. A coupler device for a tractor unit and a trailer unit including a hook member on one of said units, a hitch member movably supported adjacent one end on the other of said units, a first portion at the free end of said hitch member receivable in said hook, a pair of oppositely arranged spaced portions extended between said free end and said one end of the hitch member and converged toward said free end of the hitch member, with the length of said spaced portions being greater than the length of said first portion, said hitch member being connectible with said hook, when said tractor unit and trailer unit are out of longitudinal alignment, and said first portion movable within said hook on the application of a pulling force exerted between said two units.

9. A coupler device including a body member having a transversely extended hook portion, a hitch member with an end portion receivable in said hook portion, and a pair of oppositely arranged spaced side portions inclined outwardly from said end portion, said hook portion being receivable in the space defined within said end and said side portions, with the inclination of said side portions providing for said hitch member being connected with said hook portion when said end portion is inclined transversely relative to said hook portion, and for the movement of said end portion within said hook portion by a pulling force applied between said hitch member and body member.

ERIC M. McELHINNEY.